United States Patent
VanPay

(10) Patent No.: US 10,471,860 B2
(45) Date of Patent: Nov. 12, 2019

(54) APPARATUS AND SYSTEM FOR SEAT REPLACEMENTS FOR VEHICLES

(71) Applicant: Rob VanPay, Green Bay, WI (US)

(72) Inventor: Rob VanPay, Green Bay, WI (US)

( * ) Notice: Subject to any disclaimer, the term of this patent is extended or adjusted under 35 U.S.C. 154(b) by 0 days.

(21) Appl. No.: 15/485,381

(22) Filed: Apr. 12, 2017

(65) Prior Publication Data

US 2018/0297497 A1 Oct. 18, 2018

(51) Int. Cl.
*A47C 7/16* (2006.01)
*A47C 31/00* (2006.01)
*B60N 2/40* (2006.01)

(52) U.S. Cl.
CPC ...................... *B60N 2/40* (2013.01)

(58) Field of Classification Search
CPC ......... B62J 1/14; B62J 1/20; B62J 1/12; B62J 1/18; B62J 1/22; A47C 7/021; B29D 99/0092; B29K 2105/04; B29L 2031/771; B29L 2031/58; A61G 5/1043; A61G 5/1045; B60N 2/5833; B60N 2205/30; B60N 2/502; B60N 2/58
See application file for complete search history.

(56) References Cited

U.S. PATENT DOCUMENTS

| | | | | |
|---|---|---|---|---|
| 4,953,913 A * | 9/1990 | Graebe | ................... | A47C 7/022 297/452.25 |
| 5,444,881 A * | 8/1995 | Landi | ................... | A61G 5/1043 5/708 |
| 5,670,232 A * | 9/1997 | Bigolin | ................... | B29C 44/12 297/199 |
| 5,676,420 A * | 10/1997 | Kuipers | ....................... | B62J 1/10 297/195.1 |
| 5,741,568 A * | 4/1998 | Rudy | ....................... | A43B 7/141 36/28 |
| 6,039,396 A * | 3/2000 | Muser | ........................ | B62J 1/18 297/195.1 |
| 6,059,359 A * | 5/2000 | Cassani | ...................... | B62J 1/00 297/195.1 |
| 6,064,037 A * | 5/2000 | Weiss | ........................ | A47C 7/74 219/217 |
| 6,076,211 A * | 6/2000 | Chatman | ................... | A47C 1/13 5/417 |
| 6,357,827 B1 * | 3/2002 | Brightbill | ............... | A47C 3/025 297/312 |
| 6,481,792 B1 * | 11/2002 | Goin | ........................ | B62J 1/12 297/195.13 |
| 6,866,337 B1 * | 3/2005 | Lash | ....................... | A47C 31/11 297/188.2 |
| 6,893,087 B2 * | 5/2005 | Hancock | ................... | B62J 1/12 297/219.11 |
| 8,262,160 B2 * | 9/2012 | Mafi | ....................... | A47K 3/122 297/219.1 |
| 8,714,655 B2 * | 5/2014 | Cahall | ....................... | B60N 2/91 297/464 |
| 8,950,806 B2 * | 2/2015 | Smith | ........................ | B62J 1/20 297/195.13 |

(Continued)

*Primary Examiner* — Shin H Kim
(74) *Attorney, Agent, or Firm* — QuickChore Corp.; Anthony Whittington

(57) ABSTRACT

A device for allowing a user to ride in a vehicle is provided. The device may include: a seat unit having one or more portions of foam materials; one or more accessory units to support the functionality of the seat unit; and one or more seat configurations to attach the seat unit to the vehicle.

20 Claims, 5 Drawing Sheets

(56) References Cited

U.S. PATENT DOCUMENTS

| | | | | |
|---|---|---|---|---|
| 2001/0023835 A1* | 9/2001 | Besnard | ............... | A63B 60/62 |
| | | | | 206/315.2 |
| 2006/0290178 A1* | 12/2006 | Desser | ................ | B62J 1/14 |
| | | | | 297/214 |
| 2009/0295203 A1* | 12/2009 | Lewis | ................ | A61G 5/1043 |
| | | | | 297/219.1 |
| 2010/0133732 A1* | 6/2010 | Yamaguch I; Shigetomo ............ |
| | | | | B60N 2/002 |
| | | | | 267/140.4 |
| 2011/0140478 A1* | 6/2011 | Devereaux | .............. | B60J 11/00 |
| | | | | 296/136.02 |
| 2011/0198898 A1* | 8/2011 | Galati | ................ | B62J 1/14 |
| | | | | 297/195.13 |
| 2011/0227391 A1* | 9/2011 | Cahall | ................ | B60N 2/91 |
| | | | | 297/464 |
| 2012/0086248 A1* | 4/2012 | Morabito | ............ | B60N 2/6036 |
| | | | | 297/219.11 |
| 2013/0257112 A1* | 10/2013 | Smith | ................ | B62J 1/20 |
| | | | | 297/183.1 |
| 2016/0068088 A1* | 3/2016 | Stevens-Poire' | ......... | B60N 2/58 |
| | | | | 297/228.1 |
| 2016/0167260 A1* | 6/2016 | Thomas | ................ | B29C 44/14 |
| | | | | 428/304.4 |
| 2016/0167552 A1* | 6/2016 | Rigal | ................ | B60N 2/7017 |
| | | | | 428/159 |
| 2017/0318880 A1* | 11/2017 | Tiffin | ................ | A41D 19/0157 |

* cited by examiner

APPARATUS AND SYSTEM FOR SEAT REPLACEMENTS FOR VEHICLES

CROSS-REFERENCES TO RELATED APPLICATIONS

N/A.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE TECHNOLOGY

The present disclosure generally relates to the field of replacement parts and, more specifically, to an apparatus and a system for seat replacements for vehicles.

DESCRIPTION OF THE RELATED ART

Various vehicles frequently come equipped with plastic covered, foam cushioned seats. Due to continued exposure to the elements, i.e. sun, rain, and snow, the plastic materials that make up the seat covers begin to crack, tear, and generally disintegrate. This disintegration may be at least partially due to water moisture and other weather conditions. Once a crack develops in the cover, water will seep through to collect in the foam of the seat where it can cause even more damage. As such, replacement of the original seats can be excessively expensive and finding the replacement of original seats may be difficult due to availability.

Further, businesses that produce alternative seats often charge more in excess than the seat costs to manufacture. Similarly, specialty fabrication shops typically charge more when a seat is needed, especially for older vehicles that are no longer in production.

Therefore, what is needed is an apparatus and a system for replacement seats for vehicles.

SUMMARY

In an embodiment, a device for allowing a user to ride in a vehicle is provided. The device may include: a seat unit having one or more portions of foam materials; one or more accessory units to support the functionality of the seat unit; and one or more seat configurations to attach the seat unit to the vehicle.

In another embodiment, an apparatus for allowing a user to ride in a vehicle is provided. The apparatus may include: a seat device having one or more portions of foam materials; one or more accessory units to support the functionality of the seat device; and one or more seat configurations to attach the seat device to the vehicle.

In yet another embodiment, a system for allowing a user to ride in a vehicle is provided. The apparatus may include: a seat device having one or more portions of foam materials; one or more accessory units to support the functionality of the seat device; and one or more seat configurations to attach the seat device to the vehicle.

In still another embodiment, a means for allowing a user to ride in a vehicle is provided. The means may include: a means for supporting the user riding in a vehicle; a means for supporting the functionality of a seat device; and a means for attaching the seat device to the vehicle.

BRIEF DESCRIPTION OF THE DRAWINGS

The present invention is described in detail below with reference to the attached drawing figures, which are incorporated by reference herein and wherein.

DETAILED DESCRIPTIONS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent application, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application (other than the language of the claims). To the extent that any term recited in the claims at the end of this patent application is referred to in this patent application in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1A:
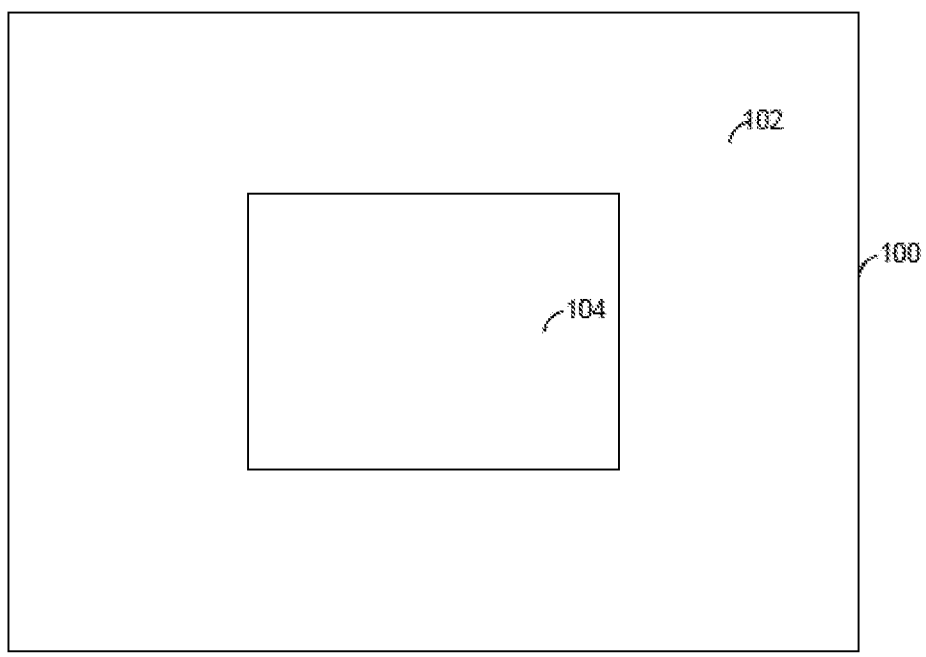
FIG. 1A is a block diagram illustrating an exemplary embodiment of the invention.
Figure 1B:
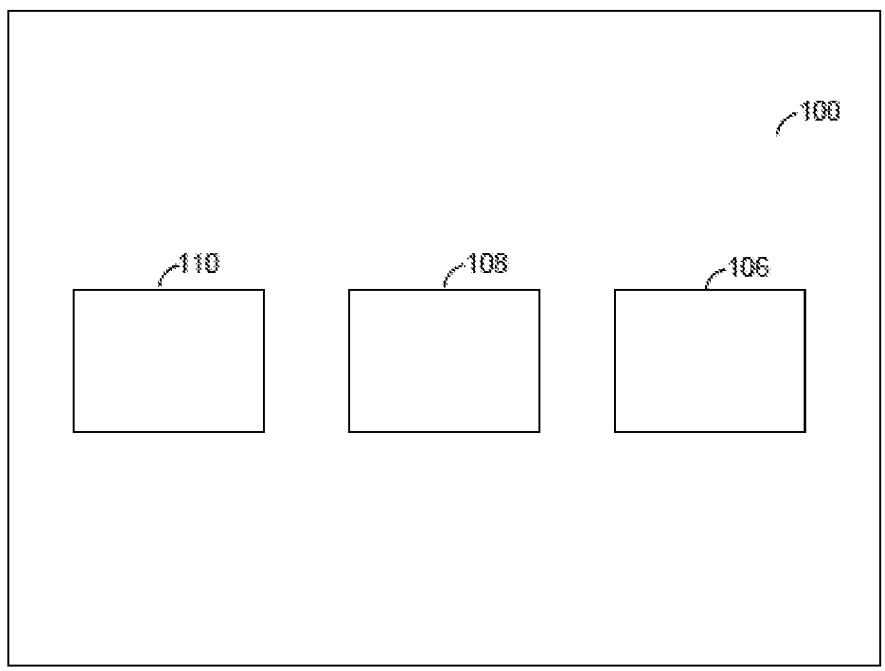
FIG. 1B is a block diagram in accordance with another exemplary embodiment of the invention.

FIGS. 1A and 1B illustrates a block diagram 100 in accordance with an exemplary embodiment of the invention. As shown in FIG. 1A, the seat device 100 may be made of one or more portions of the pressed and/or molded materials. In some embodiments, the pressed and molded seat device 100 may include an outer layer 102 surrounding a core 104 of resilient foam material. In some embodiments, the seat device 100 may include one or more seat configurations such as a rectangular configuration, a circular configuration, a cylindrical configuration, or any configuration known to those skilled in the art. As shown in FIG. 1B, the seat device 100 may include one or more seat configurations. In some embodiments, the one or more seat configurations may include a rear end piece 106, a central portion 108, and a front piece 110. In another embodiment, the seat configurations may include the seat device 100 being tapered partially or tapered completely at the front piece and may have slightly curved outer edges to enable the seat device 100 to, temporarily or permanently, overlay, attach, or affix to a seat 204 of a vehicle 206. In another embodiment, the seat device 100 may be removed from a seat 204.

Figure 2:
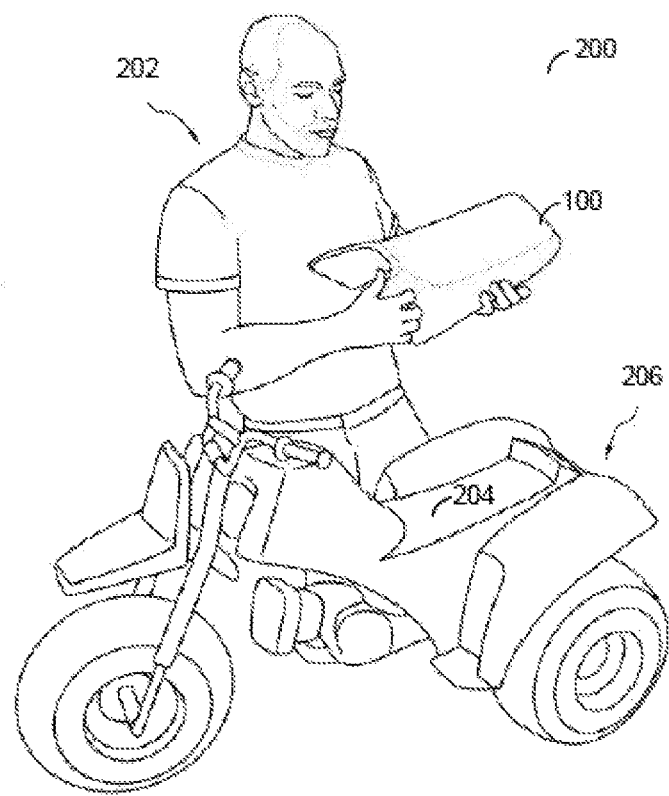
FIG. 2 is a system block diagram with a vehicle in accordance with another exemplary embodiment of the invention.

FIG. 2 illustrates a system block diagram 200 in accordance with another exemplary embodiment of the invention. As shown in FIG. 2, a user 202 may use the seat device 100 to overlay a seat 204 on a vehicle 206. In some embodiments, the vehicle 204 may be an all-terrain vehicle (ATV).

Figure 3:
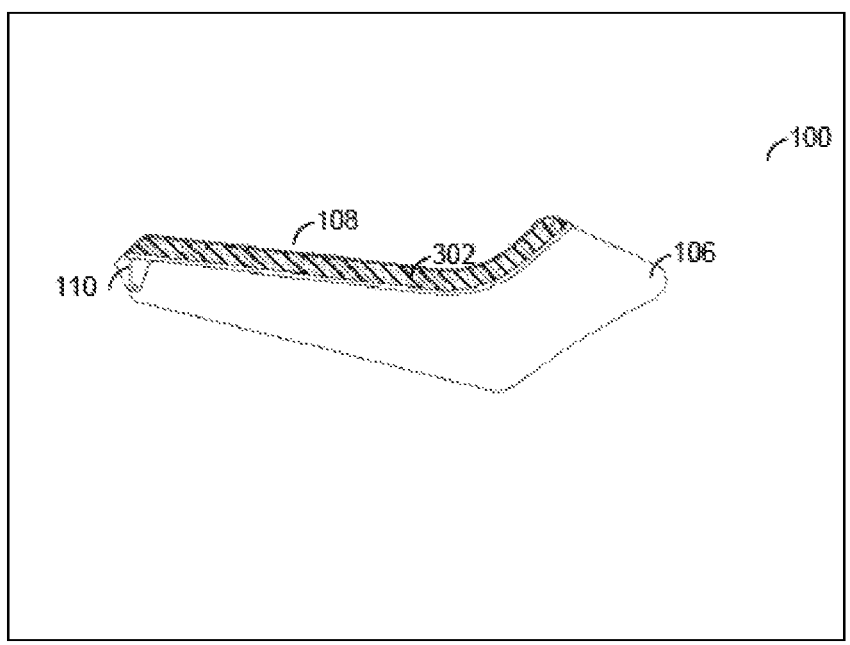
FIG. 3 is a block diagram in accordance with another exemplary embodiment of the invention.

FIG. 3 illustrates a block diagram 100 in accordance with another exemplary embodiment of the invention. As shown in FIG. 3, the seat device 100 may include one or more accessory units 302 to support the functionality of the seat device 100. In some embodiments, the accessory units 302 may include one or more components, compartments, openings, vents, and segments for expelling particles or debris that accumulates during a vehicle ride in association with the rear end piece 106, the central portion 108, and the front piece 110.

Figure 4:
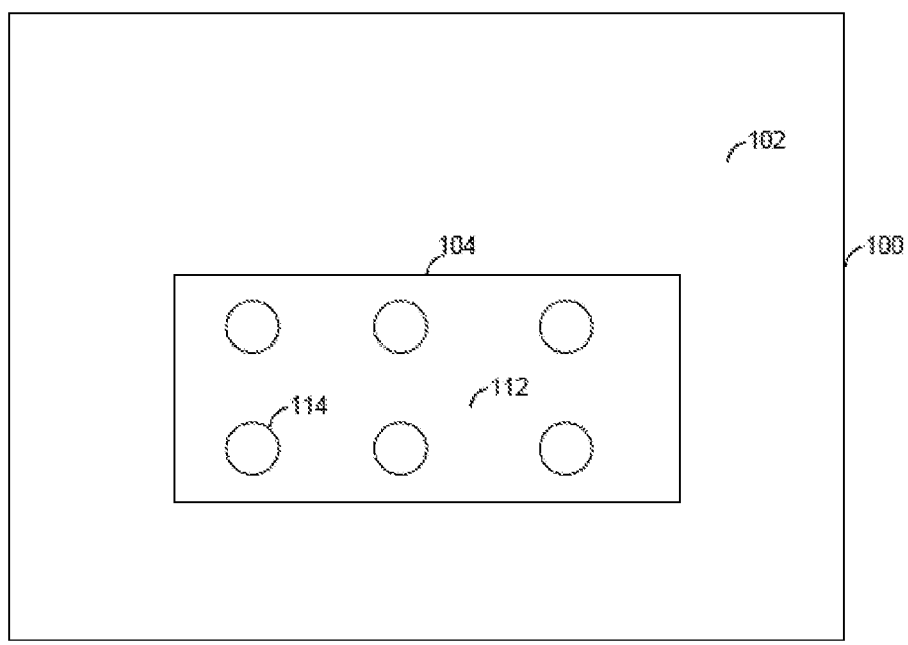
FIG. 4 is a block diagram illustrating a seat foam application in accordance with another exemplary embodiment of the invention.

FIG. 4 illustrates a block diagram 100 in accordance with another exemplary embodiment of the invention. As shown in FIG. 4, the seat device 100 may include an outer layer 102 surrounding a core 104 with one or more resilient foam materials 112. The resilient foam materials 112 may be made of one or more of the following pressed and/or molded materials: leather, neoprene, suede, vinyl, nylon, polyester, or any known material known by those skilled in the art. The resilient foam materials 112 may comprise a material composition in the range from 0% to 100% of any the one or more pressed and/or molded materials. In some embodiments, the resilient foam materials 112 may include one or more foam units 114. The foam units may include one or more mesh frames, mesh layers, shock absorbing layers, moisture absorbing layers, and spring layers that compress and/or decompress based on the weight of a load.

In some implementations, seat device 100 may be made of one or more of the following pressed and/or molded materials: leather, neoprene, suede, vinyl, nylon, polyester, or any known material known by those skilled in the art. The seat device 100 may comprise a material composition in the range from 0% to 100% of any the one or more pressed and/or molded materials.

In another embodiment, the seat device 100 may include a seat cover, a seat cushion, a seat replacement unit, or any device known by those skilled in the art. The seat device 100 may have a length, a width, or a height in the range of 1 inches to 100 inches, respectively. In some embodiments, the seat device 100 may have a length, a width, or a height in the range of between 13-17 inches, between 7-12 inches, and between 1-5 inches, respectively.

In some embodiments, the system may include a vehicle 206. The vehicle 206 may include one or more all-terrain vehicles (ATVs), snowmobiles, motorcycles, mopeds, off road vehicles (ORVs), four wheelers, golf carts, or any vehicles known by those skilled in the art.

In another embodiment, the central portion 108 may include a pair of hinges (not shown) pressed there into to form opposite sides that will flex relative to a center area. The front piece 110 may include a pair of spaced apart hinges (not shown) pressed there into to form opposite sides that will flex relative to a center area. The rear end piece 106 may include a pair of spaced apart hinges (not shown) interconnecting opposite sides with a center area. The hinges of the central portion 108 may connect to the hinges of the front piece 110 and the rear piece 106.

In some embodiments, the seat device 100 may include a front piece 110 that may include a leading edge that can be curved to allow the front piece 110 to fit around a gas can filler spout (not shown) and a gas cap (not shown) of a vehicle 206.

In another embodiment, the system may include one or more straps (not shown) that are partially or completely attachable to each of the sides of the vehicle 206 and can serve as a device for securing the seat device 100 in place overlying the seat 204 of a vehicle 206. In some embodiments, the straps may be secured to any available frame (not shown) or housing component (not shown) of the vehicle 206.

In yet another embodiment, the seat device 100 may include outer sides of the front piece 110, central portion 108, and rear piece 106 that may be interconnected or separated. In other embodiments, the seat device 100 may be positioned to overlay a vehicle seat 204 such that the outer sides protect the sides of the seat 204.

In another embodiment, an apparatus may allow for water to fall onto the seat device 100. The seat device 100 may be used to direct water into a pair of parallel grooves that extend through the central areas of the front and rear pieces of a cushion. The collected water may be then directed from the central areas through spaced apart transverse grooves connecting the grooves with the hinges. Thereafter, the water may then be directed along the hinges if the side panels are not bent over sides of a vehicle seat 204 or past the hinges and off the seat device 100. If no water is present, the grooves may allow air flow therethrough. In some embodiments, the foam filled portions on opposite sides of the grooves may be positioned beneath the buttocks of a user and provide additional cushioning to the original seat and/or additional comfort to the user.

In some implementations, a system may include a molded foam seat device that includes an upper surface having a left upper side, a right upper side, a forward upper side, and an aft upper side, and a lower surface having a left lower side, a right lower side, a forward lower side, and an aft lower side. The molded foam seat device may include a rubberized material that forms a watertight seal. This seal may be used to protect a battery of a vehicle. The molded foam seat device may include a cover that is weather resistant. The cover may include a smooth surface for providing hip and buttock comfort and support of a rider. The molded foam seat device may include a polyurethane high density molded foam. The polyurethane high density molded foam may be compression resistant to prevent permanent deformation caused by weight of a rider.

In another embodiment, the system may include a mesh seat material that includes holes through which water, snow, dust, and other small particles may pass through. By allowing such particles to pass through the seat 204, the particles may be prevented from building up on the seat. Additionally, an air gap may be provided below the mesh seat material. The air gap may open up to the ambient environment so that particles that pass through the mesh seat material are expelled from the vehicle 206.

In yet another embodiment, the apparatus may include one or more cargo storage compartments or one or more attachment locations to carry additional items or cargo. The compartments or attachments may have a rectangular, cylindrical, or circular shape. The compartments or attachments may have the dimensions of height, length, width, depth, diameter, respectively, in the ranges of 0-100 mm and/or 0-100 inches.

Many different arrangements of the various components depicted, as well as components not shown, are possible without departing from the spirit and scope of the present invention. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A device for allowing a user to ride in a vehicle comprising:
    a seat unit having one or more portions of foam materials that include one or more foam units; one or more accessory units to support a functionality of the seat unit; and one or more seat configurations to attach the seat unit to the vehicle,
    wherein the seat unit is made of at least three distinct layers of foam materials being comprised of different materials within a group: leather, neoprene, suede, vinyl, nylon, and polyester; and wherein the one or more foam units is made of at least three of: mesh layers, shock absorbing layers, spring layers, and moisture absorbing layers.

2. The device of claim 1, wherein the seat device has a length between 13 and 17 inches and a width between 7-12 inches.

3. The device of claim 1, wherein the foam materials are pressed.

4. The device of claim 1, wherein the seat unit is a seat cushion.

5. The device of claim 1, wherein the seat unit is a seat cover.

6. The device of claim 1, wherein the seat unit is a seat replacement unit.

7. The device of claim 1, wherein the foam materials are resilient.

8. The device of claim 1, wherein the accessory units are compartments.

9. An apparatus for allowing a user to ride in a vehicle comprising:
    a seat device having one or more portions of foam materials that include one or more foam units; one or more accessory units to support a functionality of the seat device; and
    one or more seat configurations to attach the seat device to the vehicle, wherein the seat device is made of at least three distinct layers of foam materials being comprised of different materials within a group: leather, neoprene, suede, vinyl, nylon, and polyester; and wherein the one or more foam units is made of at least three of: mesh layers, shock absorbing layers, spring layers, and moisture absorbing layers.

10. The apparatus of claim 9, wherein the foam materials are molded.

11. The apparatus of claim 9, wherein the foam materials are pressed.

12. The apparatus of claim 9, wherein the seat device is a seat cushion.

13. The apparatus of claim 9, wherein the seat device is a seat cover.

14. The apparatus of claim 9, wherein the seat device is a seat replacement unit.

15. A means for allowing a user to ride in a vehicle comprising:
    a means for supporting the user riding in a vehicle;
    a means for supporting a functionality of a seat device; and
    a means for attaching the seat device to the vehicle, wherein the seat device is made of at least three distinct layers of foam materials being comprised of different materials within a group: leather, neoprene, suede, vinyl, nylon, and polyester and wherein the seat device includes one or more foam units that are made of at least three of: mesh layers, shock absorbing layers, spring layers, and moisture absorbing layers.

16. The means of claim 15, wherein the means for supporting the user riding in a vehicle is a seat device.

17. The means of claim 15, wherein the means for supporting the functionality of a seat device is one or more accessory units.

18. The means of claim 15, wherein the means for attaching the seat device to the vehicle is one or more straps.

19. The means of claim 15, wherein the vehicle is an all-terrain vehicle (ATV).

20. The means of claim 15, wherein the vehicle is an off road vehicle (ORV).

* * * * *